US011671929B2

(12) United States Patent
Ryu et al.

(10) Patent No.: US 11,671,929 B2
(45) Date of Patent: Jun. 6, 2023

(54) TECHNIQUES FOR COMMUNICATION LINK SYNCHRONIZATION USING REFERENCE SIGNALS

(71) Applicant: QUALCOMM Incorporated, San Diego, CA (US)

(72) Inventors: Jung Ho Ryu, Fort Lee, NJ (US); Sony Akkarakaran, Poway, CA (US); Junyi Li, Franklin Park, NJ (US); Tao Luo, San Diego, CA (US); Tianyang Bai, Somerville, NJ (US); Kiran Venugopal, Raritan, NJ (US); Qian Zhang, Basking Ridge, NJ (US); Ling Ding, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 282 days.

(21) Appl. No.: 17/185,457

(22) Filed: Feb. 25, 2021

(65) Prior Publication Data
US 2021/0321341 A1 Oct. 14, 2021

Related U.S. Application Data

(60) Provisional application No. 63/008,421, filed on Apr. 10, 2020.

(51) Int. Cl.
*H04W 56/00* (2009.01)

(52) U.S. Cl.
CPC ................. *H04W 56/001* (2013.01)

(58) Field of Classification Search
CPC ........... H04W 56/001; H04W 56/0015; H04W 88/04; H04L 27/0006; H04L 5/0048; H04L 5/0053; H04L 5/001; H04B 7/0413
See application file for complete search history.

(56) References Cited

U.S. PATENT DOCUMENTS

| 2015/0043398 A1 | 2/2015 | Fwu et al. |
| 2016/0286508 A1* | 9/2016 | Khoryaev ......... H04W 72/1215 |
| 2022/0183006 A1* | 6/2022 | Mauritz ................ H04L 5/0007 |

OTHER PUBLICATIONS

Intel Corporation: "Remaining Synchronization Details for LTE V2V Sidelink Carrier Aggregation", 3GPP Draft, 3GPP TSG RAN WG1 Meeting #92, R1-1802365—Intel—V2X_SLCA_SYNC, 3RD Generation Partnership Project (3GPP), Mobile Competence Centre, 650, Route Des Lucioles, F-06921 Sophia-Antipolis Cedex, France, vol. Ran WG1. No. Athens. Greece, Feb. 26, 2018-Mar. 2, 2018, Feb. 17, 2018 (Feb. 17, 2018), XP051397890, pp. 1-7, Retrieved from the Internet: URL:http://www.3gpp.org/ftp/tsg% 5Fran/WG1%5FRL1/TSGR1%5F92/Docs/ [retrieved on Feb. 17, 2018] the Whole Document.

(Continued)

*Primary Examiner* — Kyaw Z Soe
(74) *Attorney, Agent, or Firm* — Dalei Dong; Holland & Hart LLP

(57) ABSTRACT

Techniques, systems, and devices for wireless communications are described. A user equipment (UE) may be in communication with a first and second transmitting device (e.g., by sidelink communication links). The UE may receive, from the first transmitting device, a first reference signal on a first set of resources. The UE may additionally receive, from the second transmitting device, a second reference signal on a second set of resources that overlap in the time domain with the first set of resources. In some cases, the first and second set of resources may additionally overlap in the frequency domain. The UE may determine synchronization information for time tracking or frequency tracking of sidelink communications with the first and second transmitting devices based on the first and second reference signals. The UE may communicate with the first and second transmitting devices based on the synchronization information for time tracking or frequency tracking.

30 Claims, 11 Drawing Sheets

(56) References Cited

OTHER PUBLICATIONS

International Search Report and Written Opinion—PCT/US2021/020037—ISA/EPO—dated Jun. 15, 2021.
Nokia, et al., "Discussions on DMRS for NR Sidelink", 3GPP Draft, 3GPP TSG RAN WG1 Meeting AH-1901, R1-1901159-NOKIA-FS_NR_V2X-Discussions on DMRS for NR Sidelink V2, 3RD Generation Partnership Project (3GPP), Mobile Competence Centre, 650, Route Des Lucioles, F-06921 Sophia-Antipolis, vol. RAN WG1, No. Taipei, Taiwan, Jan. 21, 2019-Jan. 25, 2019, Jan. 20, 2019 (Jan. 20, 2019), XP051594003, 7 Pages, Retrieved from the Internet: URL:http://www.3gpp.org/ftp/Meetings%5F3GPP%5FSYNC/RAN1/Docs/R1%2D1901159%2Ezip [retrieved on Jan. 20, 2019] the Whole Document.

\* cited by examiner

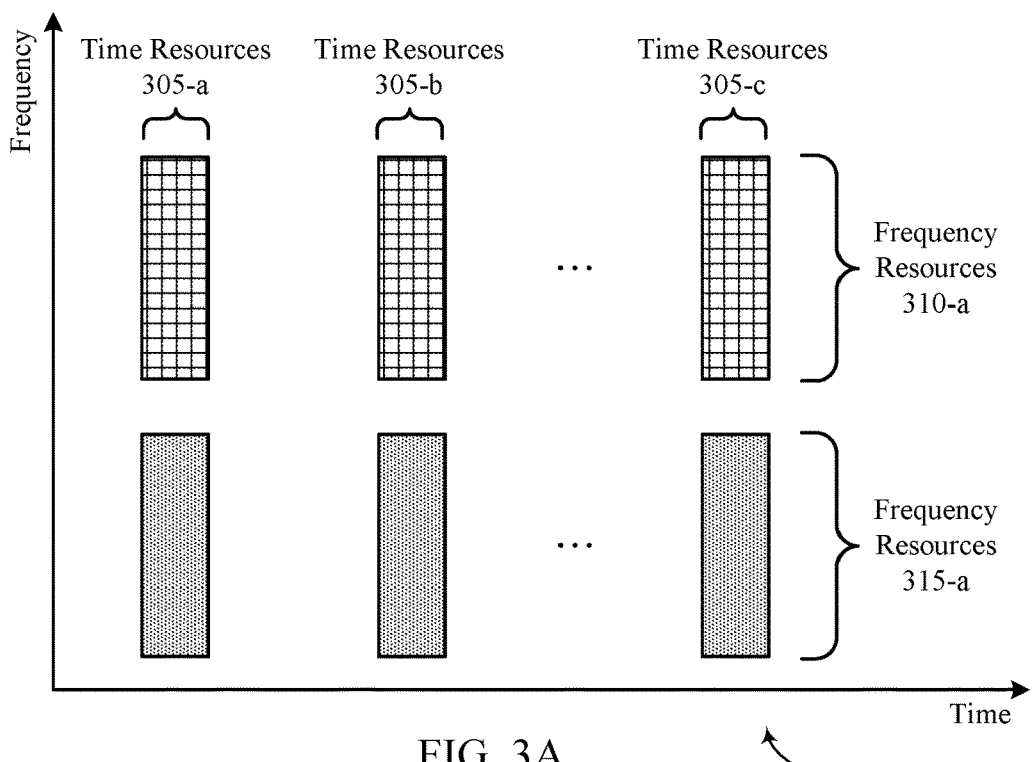
FIG. 3A
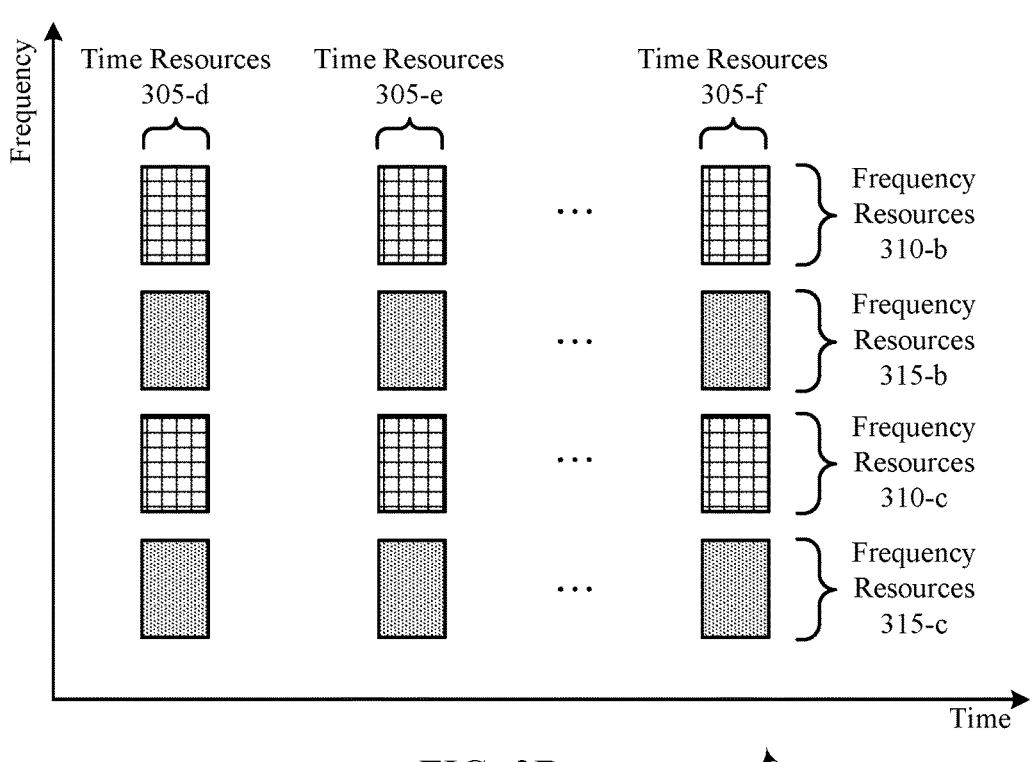
FIG. 3B
 Reference Signal 320-a   Reference Signal 320-b

TECHNIQUES FOR COMMUNICATION LINK SYNCHRONIZATION USING REFERENCE SIGNALS

CROSS REFERENCE

The present application for patent claims the benefit of U.S. Provisional Patent Application No. 63/008,421 by RYU et al., entitled "TECHNIQUES FOR COMMUNICATION LINK SYNCHRONIZATION USING REFERENCE SIGNALS," filed Apr. 10, 2020, assigned to the assignee hereof, and which is hereby incorporated by reference in its entirety.

FIELD OF DISCLOSURE

The following relates to wireless communications and more specifically to techniques for communication link synchronization using reference signals.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support the establishment of a sidelink channel for communications between two devices, such as two UEs. The two UEs may perform synchronization procedures to determine timing synchronization information or frequency synchronization information or both.

SUMMARY

The described techniques relate to improved methods, systems, devices, and apparatuses that support techniques for communication link synchronization using reference signals. For example, a first user equipment (UE) may be in communication with a second and third UE (e.g., by sidelinks). The first UE may receive, from the second UE, a first reference signal on a first set of resources. The first UE may additionally receive a second reference signal on a second set of resources from the third UE. The first set of resources and the second set of resources may overlap in the time domain. That is, the second UE and the third UE may transmit the first reference signals and the second reference signals by the same set of time resources. In some cases, the first set of resources and the second set of resources may include distinct frequency resources. In some other cases, the first set of resources and the second set of resources may also overlap in the frequency domain. In either case, the UE may determine synchronization information for time tracking or frequency tracking based on the first reference signals and the second reference signals. The UE may communicate with the first transmitting device and the second transmitting device based on the synchronization information for time tracking or frequency tracking.

A method of wireless communication by a receiving device is described. The method may include receiving, from a first transmitting device, a first reference signal on a first set of resources, receiving, from a second transmitting device, a second reference signal on a second set of resources that overlap in a time domain with the first set of resources, determining synchronization information for time tracking or frequency tracking of sidelink communications with the first transmitting device and the second transmitting device based on the first reference signal and the second reference signal, and communicating with the first transmitting device and the second transmitting device based on the synchronization information for time tracking or frequency tracking.

An apparatus for wireless communication by a receiving device is described. The apparatus may include a processor, memory coupled with the processor, and instructions stored in the memory. The instructions may be executable by the processor to cause the apparatus to receive, from a first transmitting device, a first reference signal on a first set of resources, receive, from a second transmitting device, a second reference signal on a second set of resources that overlap in a time domain with the first set of resources, determine synchronization information for time tracking or frequency tracking of sidelink communications with the first transmitting device and the second transmitting device based on the first reference signal and the second reference signal, and communicate with the first transmitting device and the second transmitting device based on the synchronization information for time tracking or frequency tracking.

Another apparatus for wireless communication by a receiving device is described. The apparatus may include means for receiving, from a first transmitting device, a first reference signal on a first set of resources, receiving, from a second transmitting device, a second reference signal on a second set of resources that overlap in a time domain with the first set of resources, determining synchronization information for time tracking or frequency tracking of sidelink communications with the first transmitting device and the second transmitting device based on the first reference signal and the second reference signal, and communicating with the first transmitting device and the second transmitting device based on the synchronization information for time tracking or frequency tracking.

A non-transitory computer-readable medium storing code for wireless communication by a receiving device is described. The code may include instructions executable by a processor to receive, from a first transmitting device, a first reference signal on a first set of resources, receive, from a second transmitting device, a second reference signal on a second set of resources that overlap in a time domain with the first set of resources, determine synchronization information for time tracking or frequency tracking of sidelink communications with the first transmitting device and the second transmitting device based on the first reference signal and the second reference signal, and communicate with the first transmitting device and the second transmitting device based on the synchronization information for time tracking or frequency tracking.

In some examples of the method, apparatuses, and non-transitory computer-readable medium described herein, determining the synchronization information may include operations, features, means, or instructions for identifying a first carrier frequency offset associated with the first transmitting device based on receiving the first reference signal, where communicating with the first transmitting device may be based on identifying the first carrier frequency offset, and identifying a second carrier frequency offset associated with the second transmitting device based on receiving the second reference signal, where communicating with the second transmitting device may be based on identifying the second carrier frequency offset.

In some examples of the method, apparatuses, and non-transitory computer-readable medium described herein, determining the synchronization information may include operations, features, means, or instructions for identifying a first timing offset associated with the first transmitting device based on receiving the first reference signal, where communicating with the first transmitting device may be based on identifying the first timing offset, and identifying a second timing offset associated with the second transmitting device based on receiving the second reference signal, where communicating with the second transmitting device may be based on identifying the second timing offset.

Some examples of the method, apparatuses, and non-transitory computer-readable medium described herein may further include operations, features, means, or instructions for establishing a first link with the first transmitting device, where receiving the first reference signal may be based on establishing the first link, and establishing a second link with the second transmitting device, where receiving the second reference signal may be based on establishing the second link.

In some examples of the method, apparatuses, and non-transitory computer-readable medium described herein, the first set of resources includes a first set of frequency resources spanning one or more time periods in the time domain, and the second set of resources includes a second set of frequency resources different than the first set of frequency resources spanning the one or more time periods in the time domain.

In some examples of the method, apparatuses, and non-transitory computer-readable medium described herein, the first set of frequency resources may be contiguous in a frequency domain, and the second set of frequency resources may be contiguous in the frequency domain.

In some examples of the method, apparatuses, and non-transitory computer-readable medium described herein, the first set of frequency resources may be interleaved with the second set of frequency resources in a frequency domain.

In some examples of the method, apparatuses, and non-transitory computer-readable medium described herein, a first instance of the first set of frequency resources and a second instance of the second set of frequency resources may be separated by a gap in a frequency domain.

In some examples of the method, apparatuses, and non-transitory computer-readable medium described herein, the first set of resources includes a set of frequency resources spanning one or more time periods in the time domain, and the second set of resources includes the set of frequency resources spanning the one or more time periods.

In some examples of the method, apparatuses, and non-transitory computer-readable medium described herein, the first reference signal may be generated using a first Zadoff-chu sequence having a first root sequence, and the second reference signal may be generated using a second Zadoff-chu sequence having a second root sequence different than the first root sequence.

In some examples of the method, apparatuses, and non-transitory computer-readable medium described herein, the first Zadoff-chu sequence and the second Zadoff-chu sequence may have a same cyclic shift.

In some examples of the method, apparatuses, and non-transitory computer-readable medium described herein, the first reference signal may be generated using a first Zadoff-chu sequence having a root sequence and a first cyclic shift, and the second reference signal may be generated using a second Zadoff-chu sequence having the root sequence and a second cyclic shift different than the first cyclic shift.

BRIEF DESCRIPTION OF THE DRAWINGS

FIGS. 3A, 3B, and 4 illustrates example reference signal configurations that support techniques for communication link synchronization using reference signals in accordance with various aspects of the present disclosure.

DETAILED DESCRIPTION

Figure 1:
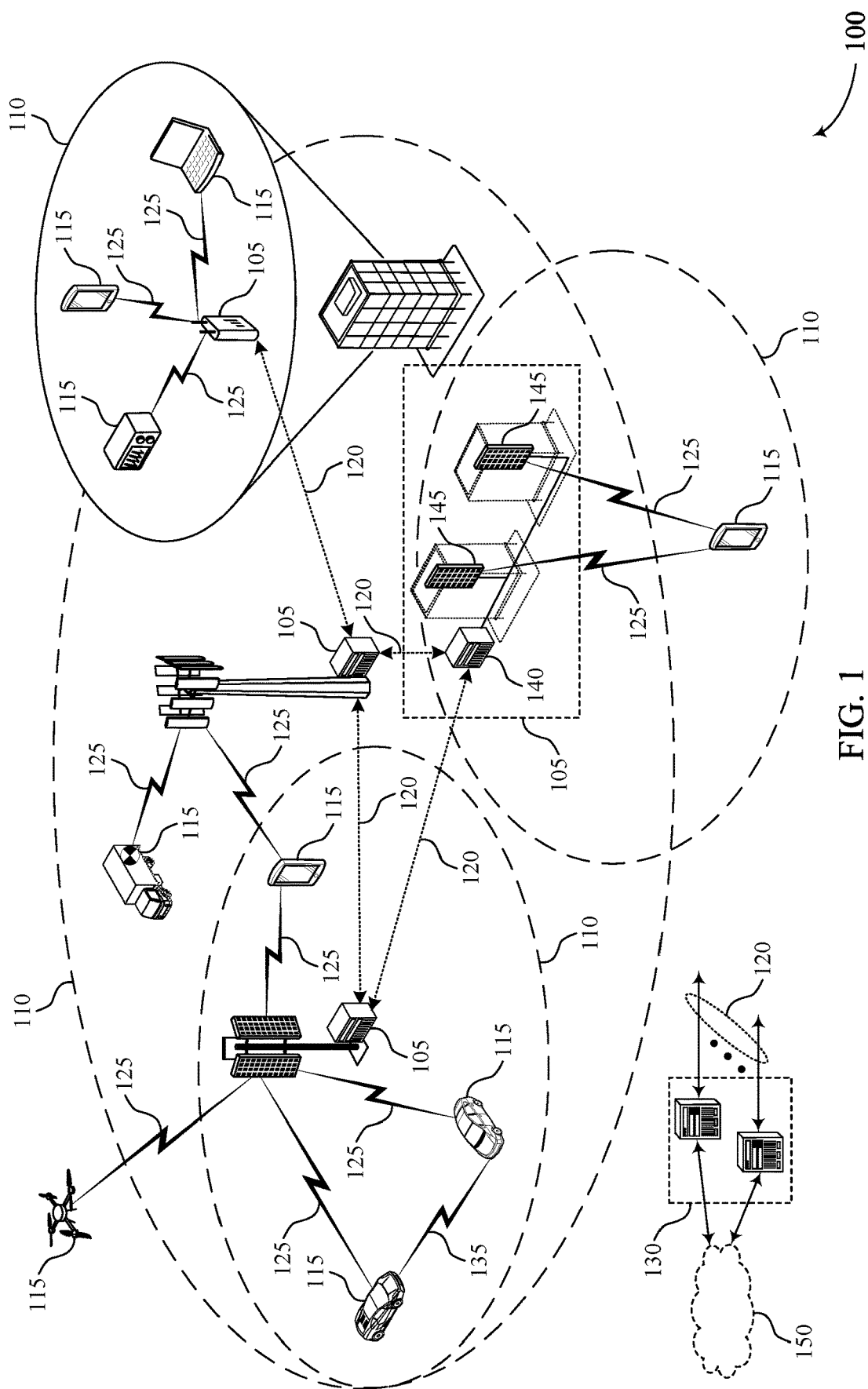
FIGS. 1 and 2 illustrates examples of wireless communications systems that support techniques for communication link synchronization using reference signals in accordance with various aspects of the present disclosure.

A wireless communications system may support sidelinks for communications between wireless devices. A sidelink may refer to any communication link between similar wireless devices (e.g., a communication link between user equipments (UEs), a backhaul communication link between base stations, etc.). For example, a UE may establish one or more sidelinks with one or more other UEs. In some cases, there may a timing offset or frequency offset associated with the first or second sidelink communications (e.g., due to a distance between the UEs, due to a relative movement between the UEs). A UE may determine synchronization information associated with each established sidelink to account for any time offsets or frequency offsets associated with the sidelink communications. In some cases, the UE may perform a synchronization procedure to determine the synchronization information.

In some cases, a first UE may perform the synchronization procedure by receiving a synchronization signal block (e.g., a sizing synchronization signal block (S-SSB) from a second UE. That is, the second UE may periodically broadcast the synchronization signal block. Here, the first UE may receive the synchronization signal block and determine the synchronization based on receiving the broadcasted synchronization signal block from the second UE. In some cases, this synchronization procedure may consume a relatively high amount of power at the transmitting UE. That is, the second UE may consume more power due to periodically broadcasting the synchronization signal block when compared to a UE that does not periodically broadcast the synchronization signal block. Additionally, the second UE may not be configured to periodically transmit the synchronization signal block. For example, a base station may not have configured the second UE to transmit the synchronization signal block periodically. In another example, the second UE may not have the capability to periodically transmit the synchronization signal block for the synchronization procedure.

In some other cases, a first UE may perform the synchronization procedure by receiving a reference signal from one or more other UEs that have established sidelinks with the first UE. For example, the first UE may be communicating with a second UE and third UE by sidelinks. Here, the second UE may transmit a first reference signal to the first UE by a first set of resources and the third UE may transmit a second reference signal to the first UE by a second set of resources. The first and second set of resources may overlap in the time domain. In some cases, the first and second set of resources may include distinct frequency resources. In some other cases, the first and second set of resources may also overlap in the frequency domain. In either case, the first UE may receive the reference signals and determine synchronization information for the respective sidelinks based on the received reference signals. This synchronization procedure may consume less power when compared to a synchronization procedure including a synchronization signal block broadcast. Additionally, the second and third UEs may perform this synchronization procedure regardless of whether the second and third UEs are configured to periodically broadcast synchronization signal blocks.

Aspects of the disclosure are initially described in the context of wireless communications systems. Examples of the disclosure or subsequently described with reference to reference signal configurations and a process flow. Aspects of the disclosure are further illustrated by and described with reference to apparatus diagrams, system diagrams, and flowcharts that relate to techniques for communication link synchronization using reference signals.

FIG. 1 illustrates an example of a wireless communications system 100 that supports techniques for communication link synchronization using reference signals in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some examples, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), unlicensed radio frequency spectrum band, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may support sidelinks for communications between wireless devices. A sidelink may refer to any communication link 135 between similar wireless devices (e.g., a communication link 135 between UEs 115, a backhaul communication link 135 between base stations 105, etc.). It is noted that while various examples provided herein are discussed for UE 115 sidelink devices, such sidelink techniques may be used for any type of wireless devices that use sidelink communications. For example, a sidelink may support device-to-device (D2D) communications, vehicle-to-everything (V2X) or vehicle-to-vehicle (V2V) communications, message relaying, discovery signaling, beacon signaling, or any combination of these or other signals transmitted over-the-air from one wireless device to one or more other wireless devices. For example, a UE 115 may establish one or more sidelinks with one or more other UEs 115. In some cases, there may a timing offset or frequency offset associated with the sidelink communications (e.g., due to a distance between the UEs 115, due to a relative movement between the UEs 115). A UE 115 may determine synchronization information associated with each established sidelinks to account for any time or frequency offsets associated with the sidelink communications. In some cases, the UE 115 may perform a synchronization procedure to determine the synchronization information.

In some cases, a first UE 115 may perform the synchronization procedure by receiving a synchronization signal block (e.g., an S-SSB) from a second UE 115. For example, the S-SSB may include one or more synchronization signals (e.g., sizing-primary synchronization signals (S-PSSs), sizing-secondary synchronization signals (S-SSSs) that the first UE 115 may receive and use to determine synchronization information. Here, the second UE 115 may periodically broadcast the synchronization signal block. Here, the first UE 115 may receive the synchronization signal block and determine the synchronization based on receiving the broadcasted synchronization signal block from the second UE 115. In some cases, this synchronization procedure may consume a relatively high amount of power at the transmitting UE 115. That is, the second UE 115 may consume more power due to periodically broadcasting the synchronization signal block on multiple beams when compared to a UE 115 that does not periodically broadcast the synchronization signal block. Additionally, the second UE 115 may not be configured to periodically transmit the synchronization signal block. For example, a base station 105 may not have configured the second UE 115 to transmit the synchronization signal block periodically (e.g., by a physical broadcast control channel (PBCCH) transmission. In another example, the second UE 115 may not have the capability to periodically transmit the synchronization signal block for the synchronization procedure.

In some other cases, a first UE 115 may perform the synchronization procedure by receiving a reference signal from one or more other UEs 115 that have established sidelinks with the first UE 115. For example, the first UE 115 may be communicating with a second UE 115 and third UE 115 by sidelinks. Here, the second UE 115 may transmit a first reference signal to the first UE 115 by a first set of resources and the third UE 115 may transmit a second reference signal to the first UE 115 by a second set of resources. The first and second set of resources may overlap in the time domain. In some cases, the first and second set of resources may include distinct frequency resources. In some other cases, the first and second set of resources may also overlap in the frequency domain. In either case, the first UE 115 may receive the reference signals and determine synchronization information for the respective sidelinks based on the received reference signals. This synchronization procedure may consume less power when compared to a synchronization procedure including a synchronization signal block broadcast. Additionally, the second UE 115 and the third UE 115 may perform this synchronization procedure regardless of whether the second UE 115 and the third UE 115 are configured to periodically broadcast synchronization signal blocks.

Figure 2:
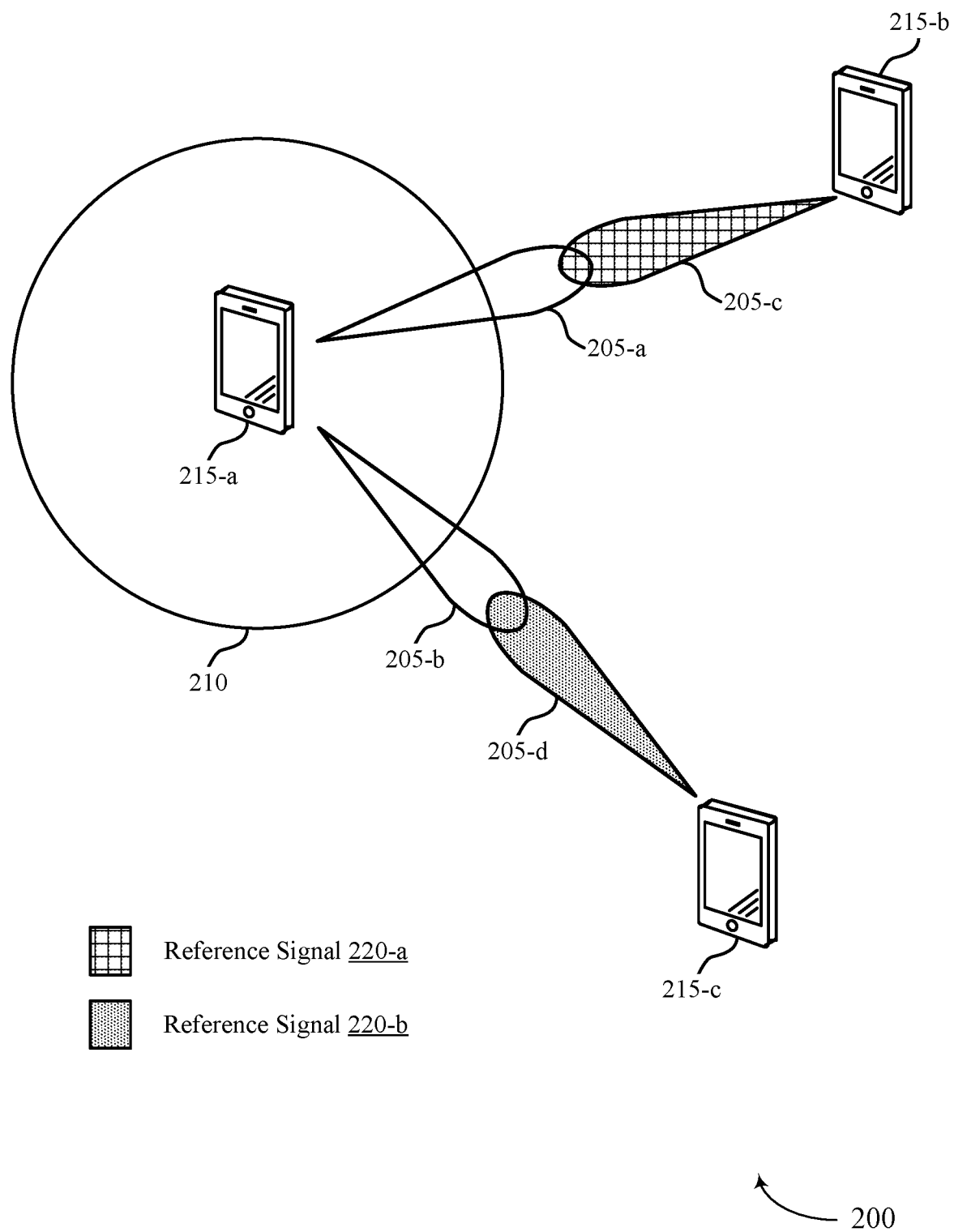

FIG. 2 illustrates an example of a wireless communications system that supports techniques for communication link synchronization using reference signals in accordance with various aspects of the present disclosure. In some examples, a wireless communications system 200 may implement aspects of wireless communications system 100, such as UEs 215, which may be examples of UEs 115 as described with reference to FIG. 1.

UE 215-*a* may communicate with UE 215-*b* and UE 215-*c* by sidelink channels. In some cases, UE 215-*a*, may have established sidelink connections with UE 215-*b* and UE 215-*c*. In some cases, each UE 215 may be configured with narrow beams 205 that may be UE 215 specific. For example, UE 215-*a* and UE 215-*b* may communicate using beam 205-*a* and beam 205-*c*. Additionally, UE 215-*a* and 215-*c* may communicate using beam 205-*b* and beam 205-*d*. After the connection between UEs 215 is established, transmit/receive beams have been determined, and initial resource synchronization has been performed, network conditions may change or UEs 215 may move relative to one another. In some cases, due to the changes in network conditions or due to the relative movement between UEs 215, the time resources or frequency resources or both between one of more UEs 215 may become offset (e.g., not synchronized).

To re-synchronize time resources or frequency resources or both, a transmitting device (e.g., a transmitting UE 215, a transmitting base station) may transmit one or more reference signals 220 to a receiving device (e.g., a receiving UE 215, a receiving base station) periodically, on-demand, or semi-persistently, or a combination thereof. For example, UE 215-b may transmit reference signal 220-a to UE 215-a by beam 205-c. Additionally, UE 215-c may transmit reference signal 220-b to UE 215-a by beam 205-d. In some cases, one or more of the transmitting devices may transmit the reference signal 220 by a pseudo-omni transmission beam. That is, a transmitting device (e.g., UE 215-b, UE 215-c) may transmit the reference signal 220 in many directions using a pseudo-omni transmission beam. The UE 215-a may receive reference signals 220 (e.g., from more than one transmitting device such as UE 215-b and UE 215-c) by a pseudo omni-reception beam 210. That is, the UE 215-a may monitor for reference signals 220 in many directions.

The UE 215-b and the UE 215-c may transmit the reference signal 220-a and reference signal 220-b, respectively, according to a reference signal configuration. For example, the UE 215-b may transmit the reference signal 220-a to the UE 215-a by a first set of resources (e.g., including a first set of frequency resources and a first set of time resources). The UE 215-c may transmit the reference signal 220-b to the UE 215-a by a second set of resources (e.g., including a second set of frequency resources and a second set of time resources). In some cases, the reference signal 220-a and the reference signal 220-b may overlap in the time domain. That is, the first set of time resources may be the same as the second set of time resources. In one example, the reference signal 220-a and the reference signal 220-b may be transmitted on distinct frequency resources. That is, the first set of frequency resources may be different (e.g., distinct from) the second set of frequency resources. In another example, the reference signal 220-a and the reference signal 220-b may be transmitted on the same frequency resources. That is, the first set of resources and the second set of resources may be the same.

The receiving device (e.g., UE 215-a) may determine synchronization information for time tracking or frequency tracking based on the received reference signals 220. For example, the UE 215-a may determine a first time offset associated with the sidelink between UE 215-a and UE 215-b based on receiving the reference signal 220-a. Additionally, the UE 215-a may determine a second time offset associated with the sidelink between UE 215-a and UE 215-c based on receiving the reference signal 220-b. The UE 215-a may determine the time offset based on a received reference signal 220 by correlating the received reference signal 220 to an expected (e.g., known) signal. The UE 215-a may identify the time offset based on a peak in the correlation. In some cases, an accuracy of the determined time offset information may be based on a cyclic prefix duration. For example, the UE 215-a may determine the time offset within 1 microsecond in the case of a 60 KHz subcarrier spacing. In another example, the UE 215-a may determine the time offset within 0.5 microseconds in the case of a 120 KHz subcarrier spacing. In other examples, the UE 215-a may determine the time offset within less than 0.5 microseconds.

The UE 215-a may also determine frequency offsets associated with sidelinks based on the received reference signals 220. For example, the UE 215-a may determine a first frequency offset associated with the sidelink between UE 215-a and UE 215-b based on receiving the reference signal 220-a. Additionally, the UE 215-a may determine a second frequency offset associated with the sidelink between UE 215-a and UE 215-c based on receiving the reference signal 220-b. In some cases, the reference signal 220 may include one or more transmissions of a same signal (e.g., a Zadoff-chu sequence). Here, the UE 215-a may determine the frequency offset based on receiving the one or more transmissions within the reference signal 220 and comparing them to an expected (e.g., known) signal (e.g., the Zadoff-chu sequence). In some other cases, the UE 215-a may determine the frequency offset based on identifying a frequency offset of the received reference signal 220. That is, the reference signal 220 may be allocated a set of frequency resources and the received reference signal 220 may be offset from those resources. The UE 215-a may determine the frequency offset within a threshold level of accuracy (e.g., within a 0.1 parts per million level of accuracy).

FIGS. 3A and 3B illustrate example reference signal configurations that support techniques for communication link synchronization using reference signals in accordance with various aspects of the present disclosure. In some examples, reference signal configurations 300 may implement aspects of wireless communications system 100 and wireless communications system 200. For example, a transmitting UE may transmit a reference signal 320 as described with reference to FIGS. 1 and 2. Additionally, a receiving UE may receive the reference signals 320 and determine synchronization information based on the reference signals 320 as described with reference to FIGS. 1 and 2. Both reference signal configuration 300-a and reference signal configuration 300-b correspond to reference signal configurations 300 where the frequency resources 310 associated with the reference signal 320-a and the frequency resources 315 associated with the reference signal 320-b do not overlap. Reference signal configuration 300-a illustrates an example where the frequency resources 310 associated with the reference signals 320-a and the frequency resources 315 associated with the reference signals 320-b are contiguous in the frequency domain while reference signal configuration 300-b illustrates an example where the frequency resources 310 associated with the reference signals 320-a and frequency resources 315 associated with the reference signals 320-b are interleaved in the frequency domain.

In some access links (e.g., communication links between a UE and a base station), reference signal configurations may be configured to communicate a single reference signal. Such conditions may exist because the resources used to communicate reference signals in an access link are dedicated to a single link between two entities. In sidelink communications, a UE may be connected with a plurality of other UEs. In such examples, different configurations of reference signals may be used to account for the different number of sidelinks that may be using the same resources to communicate reference signals. For example, a set of time resources and a set of frequency resources allocated to communicating reference signals may be configured to handle communicating multiple sets of reference signals for different sidelinks.

FIG. 3A illustrates an example reference signal configuration that supports techniques for communication link synchronization using reference signals in accordance with various aspects of the present disclosure. For example, FIG. 3A illustrates a reference signal configuration 300-a including a first reference signal 320-a (e.g., received from a first transmitting device such as a UE) and a second reference signal 320-*b* (e.g., received from a second transmitting device such as a UE). Although reference signal configuration 300-*a* illustrates two reference signals 320, the reference signal configuration 300-*a* could include additional reference signals 320 as well.

In the example of the reference signal configuration 300-*a*, a first transmitting device may transmit reference signal 320-*a* by the first set of frequency resources 310-*a* which may be contiguous in the frequency domain. Additionally, a second transmitting device may transmit reference signal 320-*b* by a second set of frequency resources 315-*a* which is also contiguous in the frequency domain. The first set of frequency resources 310-*a* may be separated from the second set of frequency resources 315-*a* by a gap in the frequency domain. In some cases (e.g., due to relative movement of the transmitting devices and a receiving device), the receiving device may receive the reference signals 320 with a frequency offset. The gap in the frequency domain between the frequency resources 310-*a* and the frequency resources 315-*a* may decrease a likelihood that the reference signals 320 overlap in the frequency domain at the receiving device.

The reference signals 320 may have overlapping time resources 305. That is, each reference signal 320 may be transmitted during time resources 305-*a*, time resources 305-*b*, and time resources 305-*c*. Here, each of the transmitting devices may transmit a reference signal 320 during the same time resources 305. The receiving device may filter each received reference signal 320 in the frequency domain. The receiving device may subsequently determine a frequency offset associated with each of the reference signals 320. Then, the receiving device may determine a timing offset associated with each of the reference signals 320.

FIG. 3B illustrates an example reference signal configuration that supports techniques for communication link synchronization using reference signals in accordance with various aspects of the present disclosure. For example, FIG. 3B illustrates a reference signal configuration 300-*b* including a first reference signal 320-*a* (e.g., received from a first transmitting device such as a UE) and a second reference signal 320-*b* (e.g., received from a second transmitting device such as a UE). Although reference signal configuration 300-*b* illustrates two reference signals 320, the reference signal configuration 300-*b* could include additional reference signals 320 as well.

In the example of the reference signal configuration 300-*b*, a first transmitting device may transmit reference signal 320-*a* by the frequency resources 310-*b* and the frequency resources 310-*c*, which may be discontinuous in the frequency domain. Additionally, a second transmitting device may transmit reference signal 320-*b* by frequency resources 315-*b* and 315-*c*, which may also be discontinuous in the frequency domain. Here, the frequency resources 310-*b* and the frequency resources 310-*c* associated with the reference signal 320-*a* may be interleaved with the frequency resources 315-*b* and the frequency resources 315-*c* in the frequency domain. In some cases, interleaving the frequency resources 310 and 315 may decrease a likelihood that selective fading (e.g., frequency-specific interference) prevents a receiving device from determining synchronization information based on a reference signal 320. The frequency resources 310 may be separated from the frequency resources 315 by a gap in the frequency domain. In some cases (e.g., due to relative movement of the transmitting devices and a receiving device), the receiving device may receive the reference signals 320 with a frequency offset. The gap in the frequency domain between the frequency resources 310 and the frequency resources 315 may decrease a likelihood that the reference signals 320 overlap in the frequency domain at the receiving device.

The reference signals 320 may have overlapping time resources 305. That is, each reference signal 320 may be transmitted during time resources 305-*d*, time resources 305-*e*, and time resources 305-*f*. Here, each of the transmitting devices may transmit a reference signal 320 during the same time resources 305. The receiving device may filter each received reference signal 320 in the frequency domain. The receiving device may subsequently determine a frequency offset associated with each of the reference signals 320. Then, the receiving device may determine a timing offset associated with each of the reference signals 320.

Figure 4:
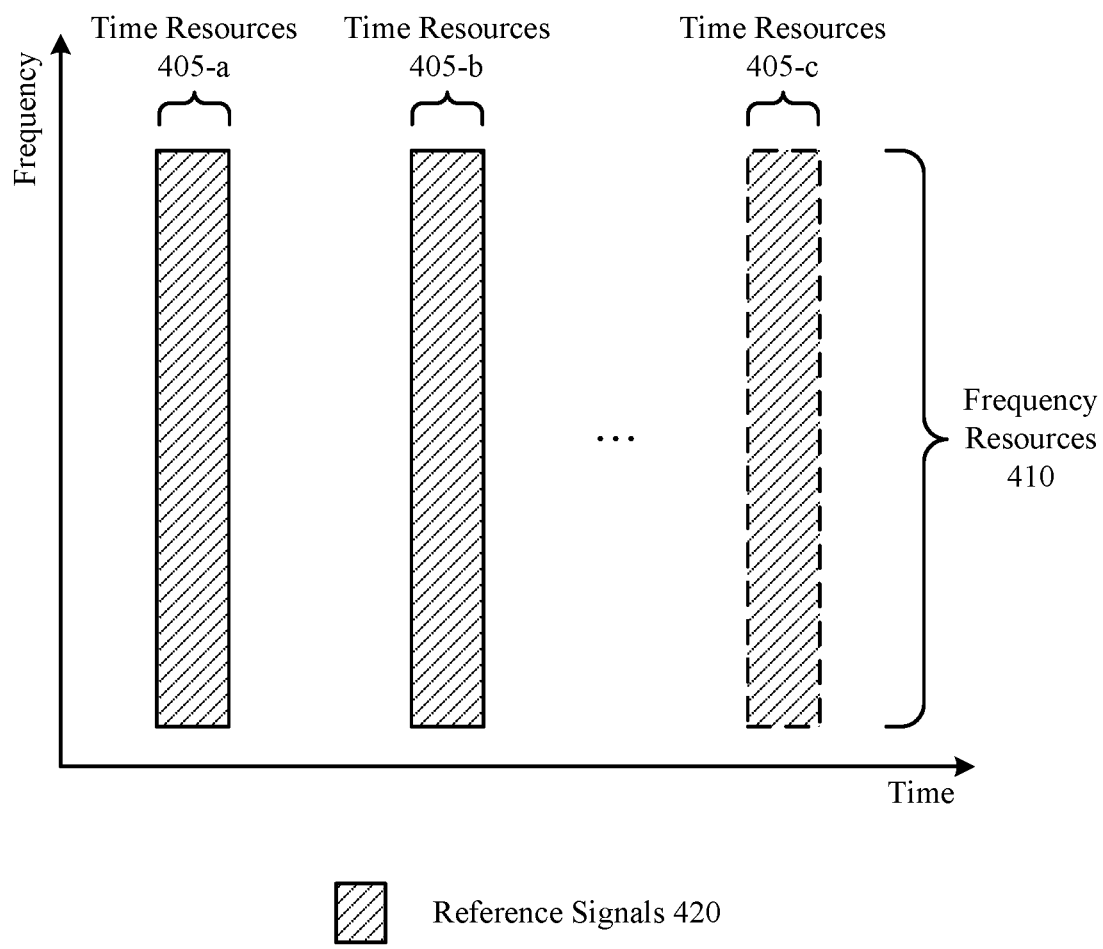

FIG. 4 illustrates an example of a reference signal configuration that supports techniques for communication link synchronization using reference signals in accordance with various aspects of the present disclosure. In some examples, a reference signal configuration 400 may implement aspects of wireless communications system 100 and wireless communications system 200. For example, a transmitting UE may transmit a reference signal 420 as described with reference to FIGS. 1 and 2. Additionally, a receiving UE may receive the reference signals 420 and determine synchronization information based on the reference signals 420 as described with reference to FIGS. 1 and 2.

The reference signals 420 may be overlapping in the frequency domain and the time domain. That is, a first transmitting device may transmit one of the reference signals 420 across the frequency resources 410 and during the time resources 405-*a*, the time resources 405-*b*, and, in some cases, during additional time resources 405-*c*. Additionally, a second transmitting device may transmit another of the reference signals 420 across the same frequency resources 410 and during the same time resources 405-*a*, time resources 405-*b*, and, in some cases, during additional time resources 405-*c*. Here, the transmitting devices may each generate one of the reference signals 420 using a Zadoff-chu sequence. Thus, a receiving device may be able to filter the reference signals 420 to identify a single reference signal and determine synchronization information based on the single reference signal.

Each Zadoff-chu sequence may be associated with a root sequence, a cyclic shift, and a length (e.g., a prime number). The length of the Zadoff-chu sequence may impact the amount of frequency resources 410 the reference signals 420 span. For example, a reference signal generated using a Zadoff-chu sequence with a length of 133 may span more frequency resources 410 than a reference signal generated using a Zadoff-chu sequence with a length less than 133. Thus, the length of the Zadoff-chu sequence may be based on a target bandwidth size and a subcarrier spacing in light of a maximum carrier frequency offset (e.g., due to a relative speed between the receiving device and the transmitting devices). For example, a maximum carrier frequency offset may be 60 KHz. In this example, each of the reference signals may be generated using a Zadoff-chu sequence with a length less than or equal to 133. This may account for the target bandwidth (e.g., 8 MHz) and the maximum carrier frequency offset (e.g., 60 KHz).

In one example, each of the reference signals 420 may be generated using a Zadoff-chu sequence having a unique root sequence. For example, a first transmitting device may generate one of the reference signals 420 using a Zadoff-chu sequence with a first root sequence and a second transmitting device may generate one of the reference signals 420 using a Zadoff-chu sequence with a second root sequence different than the first root sequence. Here, each transmitting device may generate the reference signals 420 using Zadoff-chu sequences with a same cyclic shift. For example, each transmitting device may generate the reference signals 420 using Zadoff-chu sequences with no cyclic shift. In some cases, reference signals 420 each generated using Zadoff-chu sequences having a unique root and a same cyclic shift may have a low cress correlation.

In another example, each of the reference signals 420 may be generated using Zadoff-chu sequences having a same root sequence and a unique cyclic shift. For example, a first transmitting device may generate one of the reference signals 420 using a Zadoff-chu sequence with a Zadoff-chu sequence having a first root and a first cyclic shift. A second transmitting device may generate one of the reference signals 420 using a Zadoff-chu sequence having the first root and a second cyclic shift. In some cases, reference signals 420 each generated using Zadoff-chu sequences having a same root sequence and a unique cyclic shift may have zero cross correlation.

Figure 5:
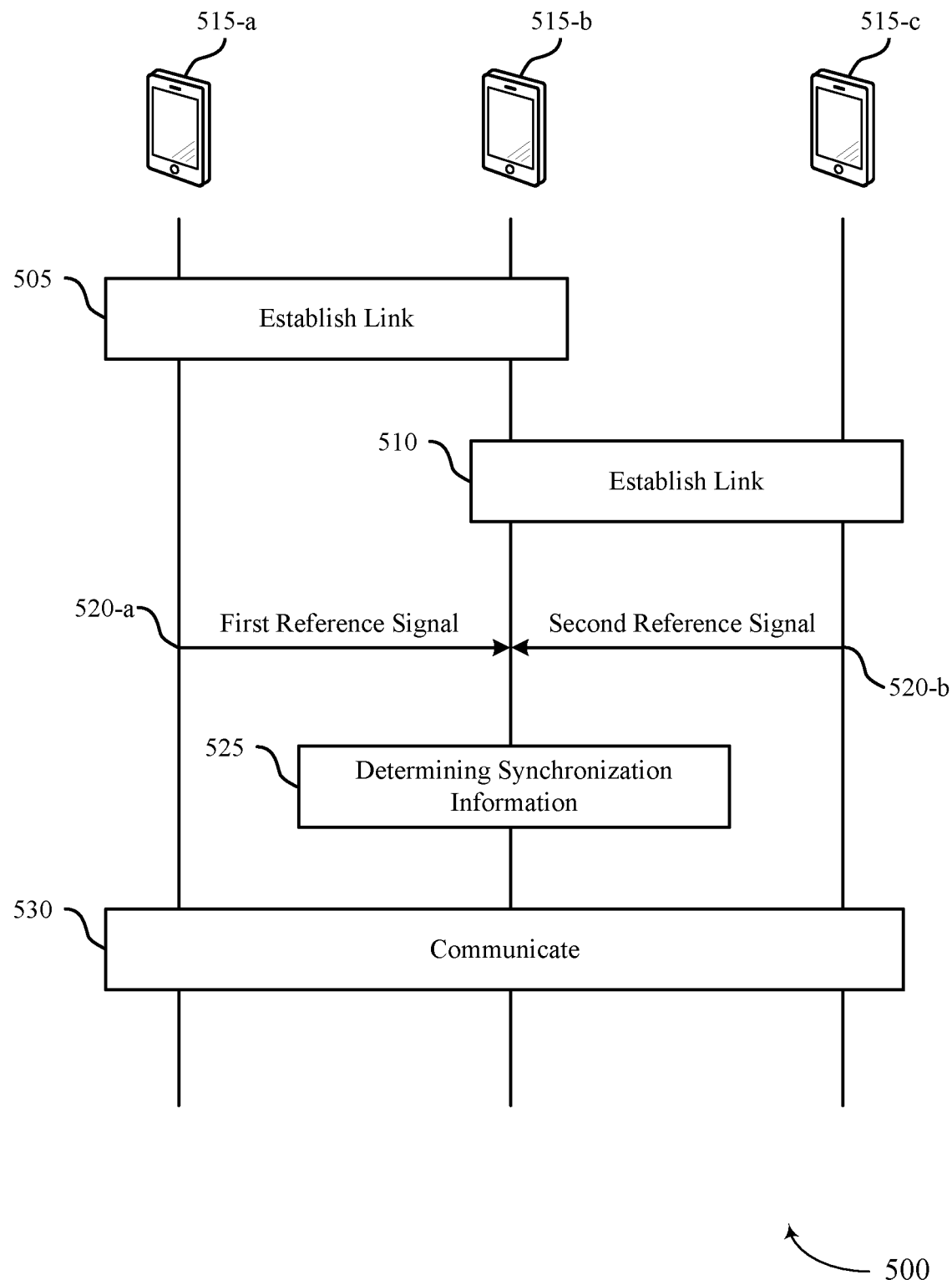
FIG. 5 illustrates an example of a process flow that supports techniques for communication link synchronization using reference signals in accordance with various aspects of the present disclosure.

FIG. 5 illustrates an example of a process flow that supports techniques for communication link synchronization using reference signals in accordance with various aspects of the present disclosure. In some examples, a process flow 500 may implement aspects of FIGS. 1 through 4. For example, UE 515-*a*, UE 515-*b*, and UE 515-*c* may be examples of UEs as described with reference to FIGS. 1 through 4. Additionally, UE 515-*a* and UE 515-*c* may generate reference signals according to the reference signal configurations as described with reference to FIG. 3A, FIG. 3B, or FIG. 4. In some cases, instead of a UE 515 implementing the resource synchronization procedure, a different type of wireless device (e.g., a base station) may perform the synchronization resource procedure. Alternative examples of the following may be implemented, where some steps are performed in a different order than described or are not performed at all. In some cases, steps may include additional features not mentioned below, or further steps may be added.

At 505, UE 515-*a* and UE 515-*b* may establish a communication link (e.g., a sidelink). At 510, UE 515-*b* and UE 515-*c* may also establish a communication link (e.g., a sidelink).

At 520-*a*, UE 515-*a* may transmit a first reference signal to UE 515-*b* on a first set of resources. At 520-*b*, UE 515-*c* may transmit a second reference signal to UE 515-*b* on a second set of resources that overlap in a time domain with the first set of resources. UE 515-*a* and UE 515-*c* may transmit the reference signals to UE 515-*b* periodically, on-demand (e.g., in response to a request from UE 515-*b*), or semi-persistently.

In one example, UE 515-*a* may transmit the first reference signal by a first set of frequency resources and UE 515-*c* may transmit the second reference signal by a second set of frequency resources different than the first set of frequency resources. In some cases, the first set of frequency resources are contiguous in a frequency domain and the second set of frequency resources are contiguous in the frequency domain. In other cases, the first set of frequency resources are interleaved with the second set of frequency resources in the frequency domain. In either case, the first reference signal and the second reference signal may be separated by a gap (or gaps) in the frequency domain.

In another example, UE 515-*a* may transmit the first reference signal by a set of frequency resources and UE 515-*c* may transmit the second reference signal by the same set of frequency resources. In one case, UE 515-*a* may generate the first reference signal using a first Zadoff-chu sequence having a first root sequence and UE 515-*c* may generate the second reference signal using a second Zadoff-chu sequence having a second root sequence different than the first root sequence. Here, both the first Zadoff-chu sequence and the second Zadoff-chu sequence may have a same cyclic shift (e.g., no cyclic shift). In other cases, UE 515-*a* may generate the first reference signal using a first Zadoff-chu sequence having a first root sequence and a first cyclic shift and UE 515-*c* may generate the second reference signal using a second Zadoff-chu sequence having the first root sequence and a second cyclic shift different than the first cyclic shift.

At 525, UE 515-*b* may determine synchronization information for time tracking or frequency tracking of sidelink communications with UE 515-*a* and UE 515-*c* based on the first reference signal and the second reference signal. For example, UE 515-*b* may identify a first carrier frequency offset and a first timing offset associated with UE 515-*a* based on receiving the first reference signal. Additionally, UE 515-*b* may identify a second carrier frequency offset and a second timing offset associated with UE 515-*c* based on receiving the second reference signal.

At 530, UE 515-*b* may communicate with UE 515-*a* and UE 515-*b* based on the synchronization information for time tracking or frequency tracking.

Figure 6:
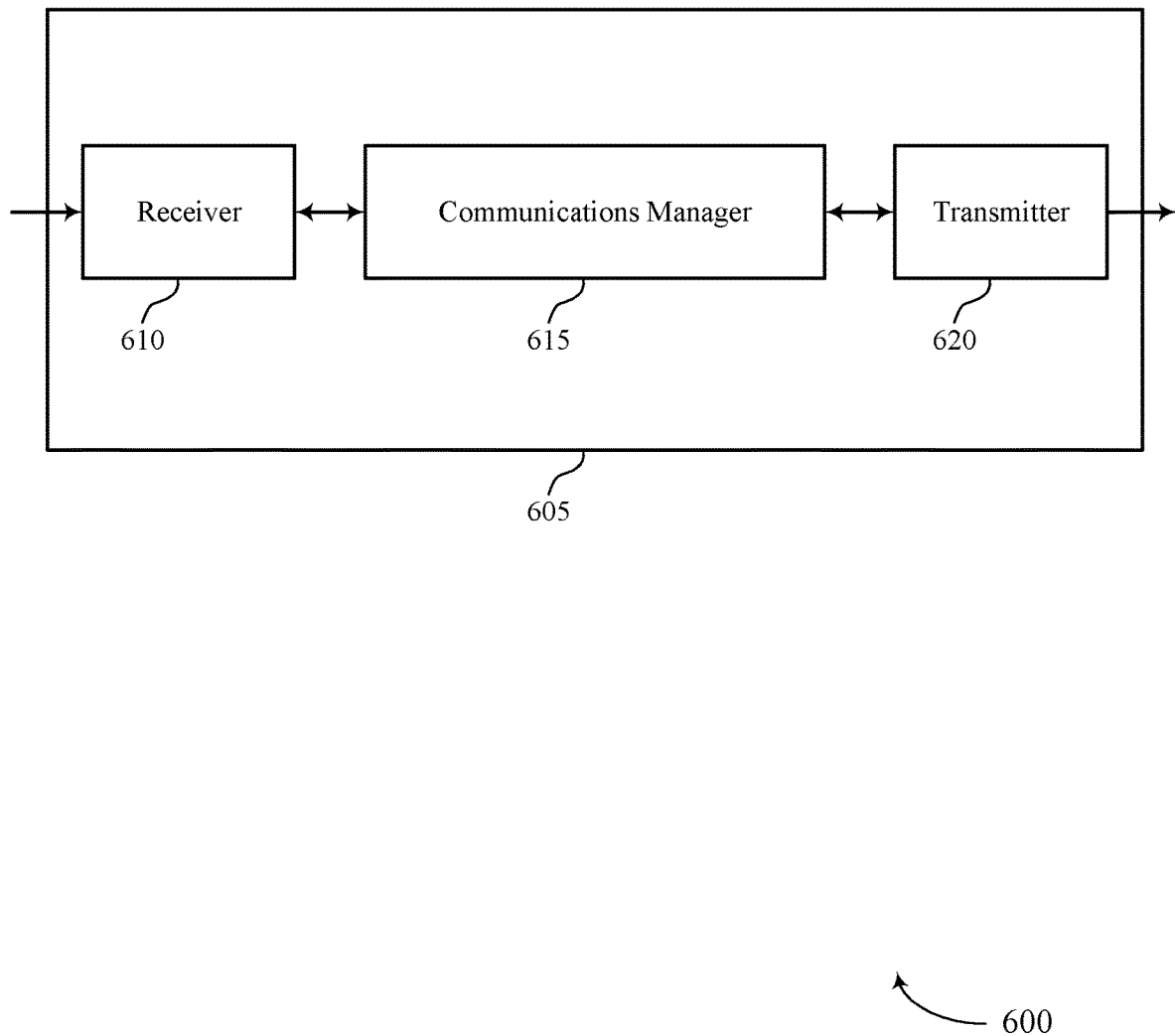
FIGS. 6 and 7 show block diagrams of devices that support techniques for communication link synchronization using reference signals in accordance with various aspects of the present disclosure.

FIG. 6 shows a block diagram 600 of a device 605 that supports techniques for communication link synchronization using reference signals in accordance with various aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to techniques for communication link synchronization using reference signals, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a first transmitting device, a first reference signal on a first set of resources, receive, from a second transmitting device, a second reference signal on a second set of resources that overlap in a time domain with the first set of resources, determine synchronization information for time tracking or frequency tracking of sidelink communications with the first transmitting device and the second transmitting device based on the first reference signal and the second reference signal, and communicate with the first transmitting device and the second transmitting device based on the synchronization information for time tracking or frequency tracking. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver component. For example, the transmitter 620 may be an example of aspects of the transceiver 920 described with reference to FIG. 9. The transmitter 620 may utilize a single antenna or a set of antennas.

Figure 7:
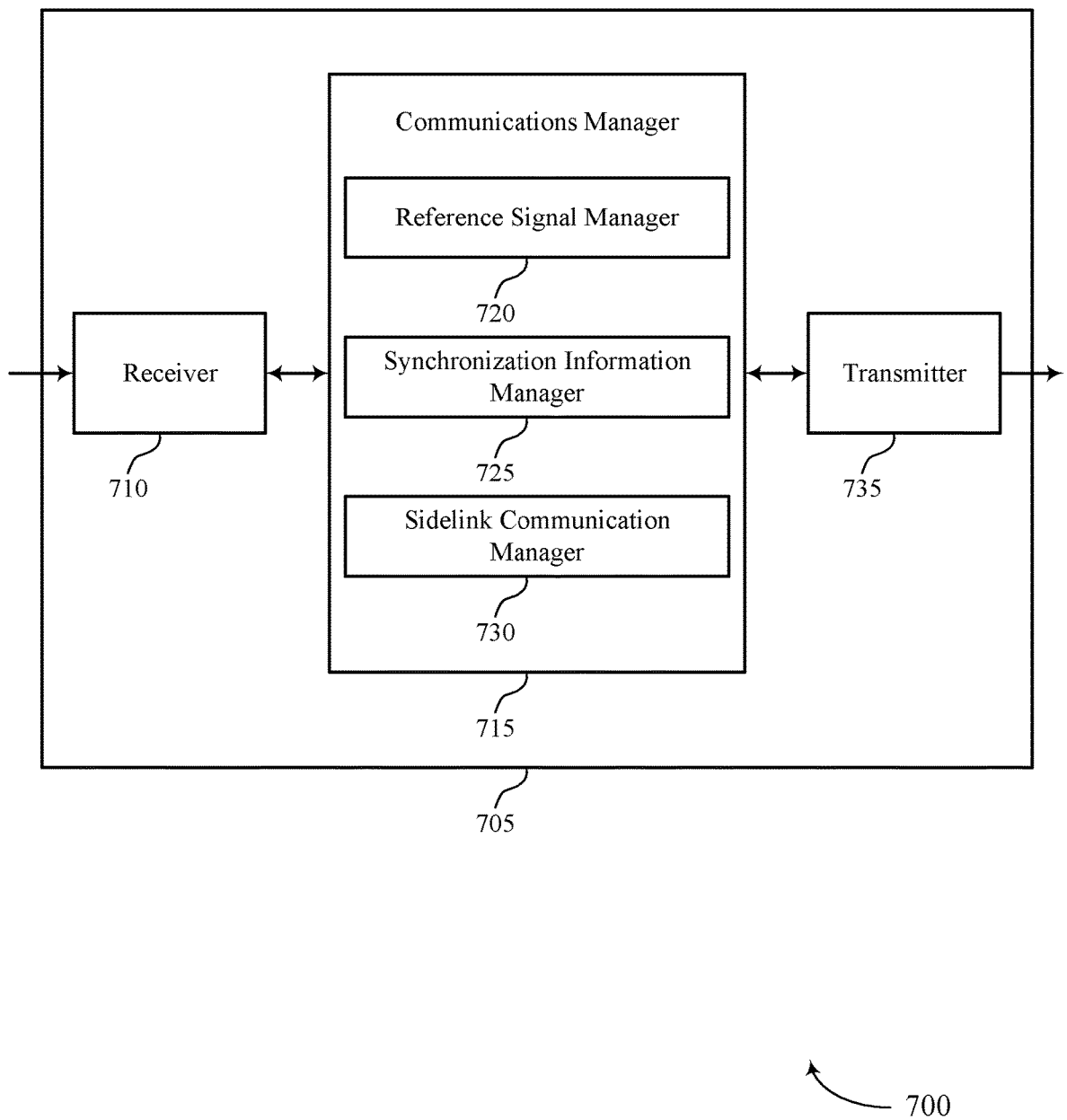

By configuring the communications manager 615 in accordance with examples as described herein, the device 605 may support techniques for communication link synchronization using reference signals with one or more potential advantages including reduced power consumption and more efficient utilization of communication resources. FIG. 7 shows a block diagram 700 of a device 705 that supports techniques for communication link synchronization using reference signals in accordance with various aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to techniques for communication link synchronization using reference signals, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a reference signal manager 720, a synchronization information manager 725, and a sidelink communication manager 730. The communications manager 715 may be an example of aspects of the communications manager 910 described herein.

The reference signal manager 720 may receive, from a first transmitting device, a first reference signal on a first set of resources and receive, from a second transmitting device, a second reference signal on a second set of resources that overlap in a time domain with the first set of resources.

The synchronization information manager 725 may determine synchronization information for time tracking or frequency tracking of sidelink communications with the first transmitting device and the second transmitting device based on the first reference signal and the second reference signal.

The sidelink communication manager 730 may communicate with the first transmitting device and the second transmitting device based on the synchronization information for time tracking or frequency tracking.

The transmitter 735 may transmit signals generated by other components of the device 705. In some examples, the transmitter 735 may be collocated with a receiver 710 in a transceiver component. For example, the transmitter 735 may be an example of aspects of the transceiver 920 described with reference to FIG. 9. The transmitter 735 may utilize a single antenna or a set of antennas.

By configuring the communications manager 715 in accordance with examples as described herein, the device 705 may support techniques for communication link synchronization using reference signals with one or more potential advantages including reduced power consumption and more efficient utilization of communication resources.

Figure 8:
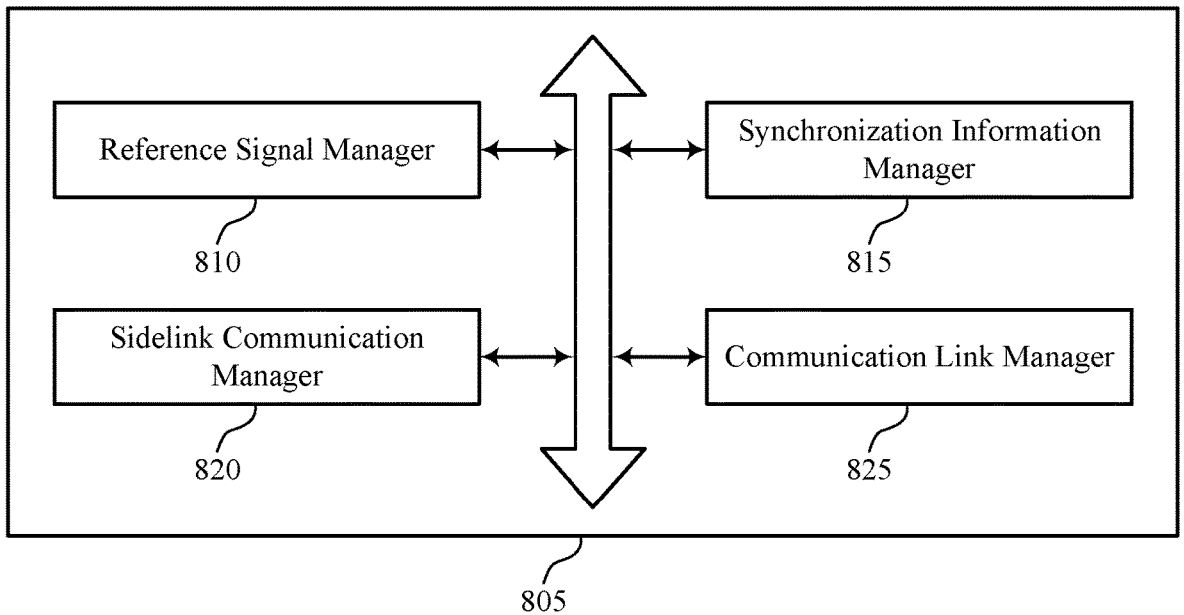
FIG. 8 shows a block diagram of a communications manager that supports techniques for communication link synchronization using reference signals in accordance with various aspects of the present disclosure.

FIG. 8 shows a block diagram 800 of a communications manager 805 that supports techniques for communication link synchronization using reference signals in accordance with various aspects of the present disclosure. The communications manager 805 may be an example of aspects of a communications manager 615, a communications manager 715, or a communications manager 910 described herein. The communications manager 805 may include a reference signal manager 810, a synchronization information manager 815, a sidelink communication manager 820, and a communication link manager 825. Each of these components may communicate, directly or indirectly, with one another (e.g., via one or more buses).

The reference signal manager 810 may receive, from a first transmitting device, a first reference signal on a first set of resources. The reference signal manager 810 may additionally receive, from a second transmitting device, a second reference signal on a second set of resources that overlap in a time domain with the first set of resources. In some cases, the first set of resources includes a set of frequency resources spanning one or more time periods in the time domain. In some examples, the second set of resources includes the set of frequency resources spanning the one or more time periods.

In some cases, the first set of resources includes a first set of frequency resources spanning one or more time periods in the time domain. In some instances, the second set of resources includes a second set of frequency resources different than the first set of frequency resources spanning the one or more time periods in the time domain. In some examples, the first set of frequency resources are contiguous in a frequency domain. In some cases, the second set of frequency resources are contiguous in the frequency domain. In some other examples, the first set of frequency resources are interleaved with the second set of frequency resources in a frequency domain. In some cases, a first instance of the first set of frequency resources and a second instance of the second set of frequency resources are separated by a gap in a frequency domain.

In some cases, the first reference signal is generated using a first Zadoff-chu sequence having a first root sequence. In some examples, the second reference signal is generated using a second Zadoff-chu sequence having a second root sequence different than the first root sequence. In some instances, the first Zadoff-chu sequence and the second Zadoff-chu sequence have a same cyclic shift. In some other instances, the first reference signal is generated using a first Zadoff-chu sequence having a root sequence and a first cyclic shift. In some examples, the second reference signal is generated using a second Zadoff-chu sequence having the root sequence and a second cyclic shift different than the first cyclic shift.

The synchronization information manager 815 may determine synchronization information for time tracking or frequency tracking of sidelink communications with the first transmitting device and the second transmitting device based on the first reference signal and the second reference signal. For example, the synchronization information manager 815 may identify a first carrier frequency offset associated with the first transmitting device based on receiving the first reference signal, where communicating with the first transmitting device is based on identifying the first carrier frequency offset. Additionally, the synchronization information manager 815 may identify a second carrier frequency offset associated with the second transmitting device based on receiving the second reference signal, where communicating with the second transmitting device is based on identifying the second carrier frequency offset.

In some cases, the synchronization information manager 815 may identify a first timing offset associated with the first transmitting device based on receiving the first reference signal, where communicating with the first transmitting device is based on identifying the first timing offset. In some other cases, the synchronization information manager 815 may identify a second timing offset associated with the second transmitting device based on receiving the second reference signal, where communicating with the second transmitting device is based on identifying the second timing offset.

The sidelink communication manager 820 may communicate with the first transmitting device and the second transmitting device based on the synchronization information for time tracking or frequency tracking.

The communication link manager 825 may establish a first link with the first transmitting device, where receiving the first reference signal is based on establishing the first link. The communication link manager 825 may additionally establish a second link with the second transmitting device, where receiving the second reference signal is based on establishing the second link.

Figure 9:
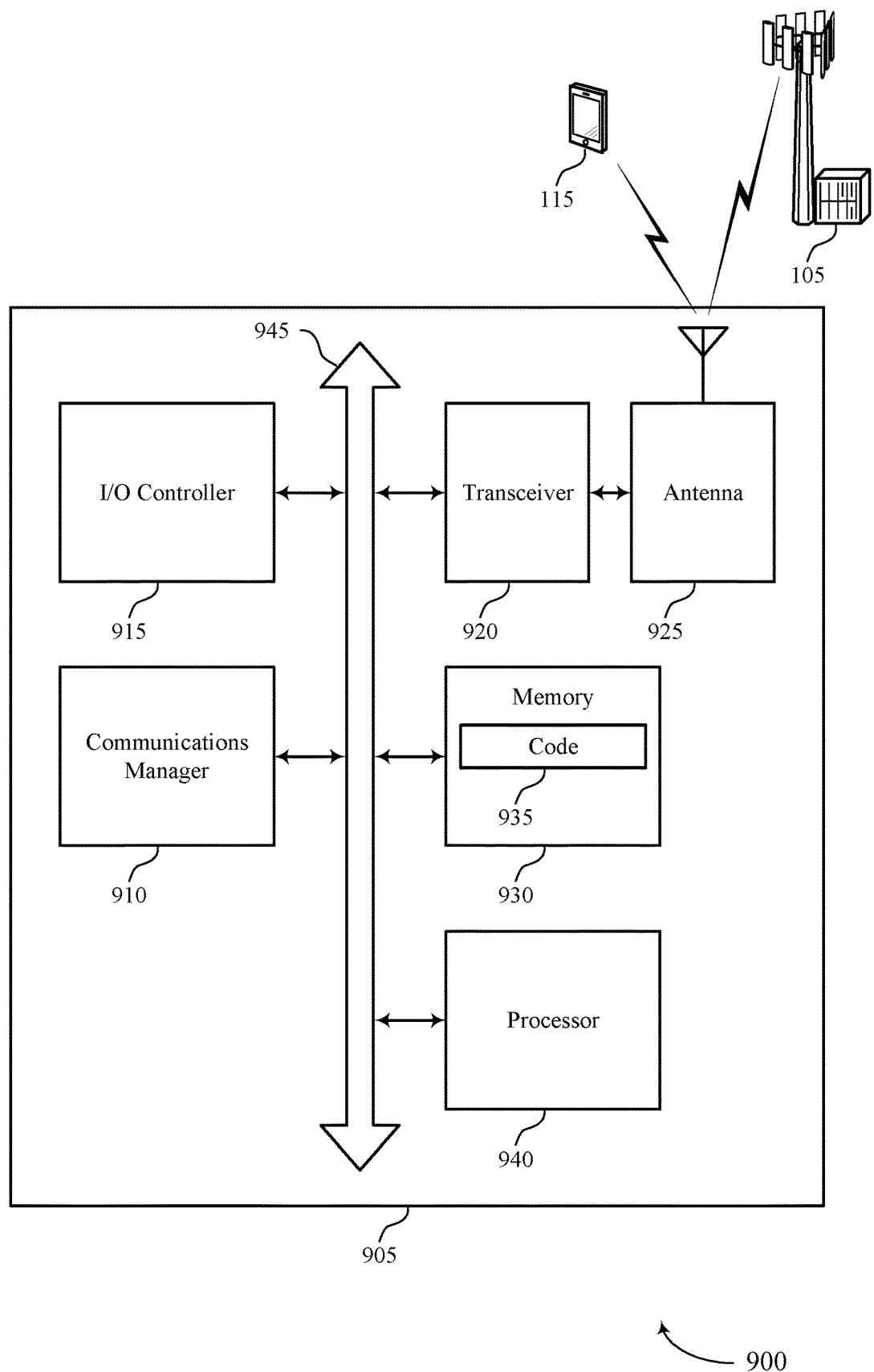
FIG. 9 shows a diagram of a system including a device that supports techniques for communication link synchronization using reference signals in accordance with various aspects of the present disclosure.

FIG. 9 shows a diagram of a system 900 including a device 905 that supports techniques for communication link synchronization using reference signals in accordance with various aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a first transmitting device, a first reference signal on a first set of resources, receive, from a second transmitting device, a second reference signal on a second set of resources that overlap in a time domain with the first set of resources, determine synchronization information for time tracking or frequency tracking of sidelink communications with the first transmitting device and the second transmitting device based on the first reference signal and the second reference signal, and communicate with the first transmitting device and the second transmitting device based on the synchronization information for time tracking or frequency tracking.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a digital signal processor (DSP), a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for communication link synchronization using reference signals).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
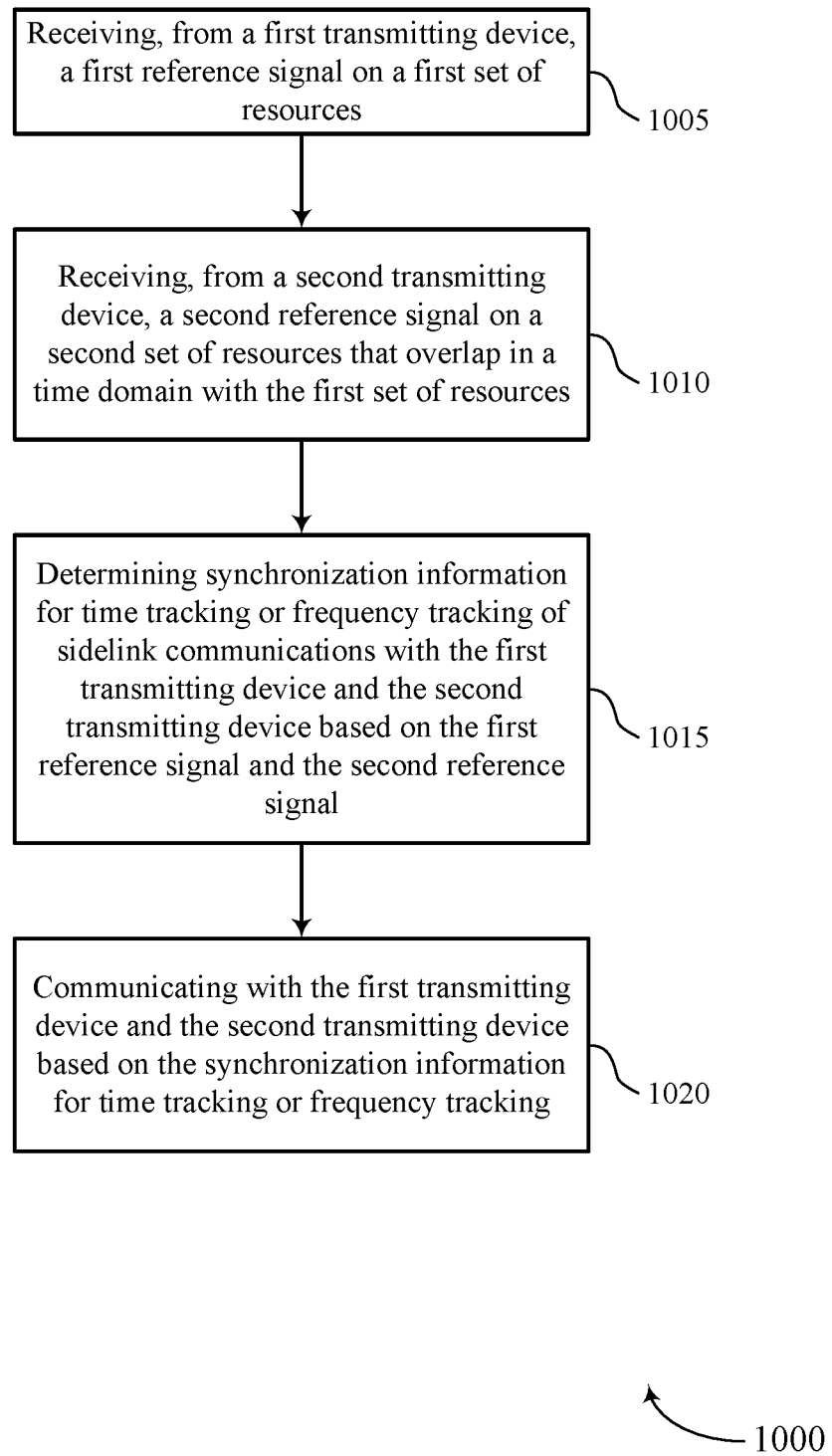
FIGS. 10 and 11 show flowcharts illustrating methods that support techniques for communication link synchronization using reference signals in accordance with various aspects of the present disclosure.

FIG. 10 shows a flowchart illustrating a method 1000 that supports techniques for communication link synchronization using reference signals in accordance with various aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1005, the UE may receive, from a first transmitting device, a first reference signal on a first set of resources. The operations of 1005 may be performed according to the methods described herein. In some examples, aspects of the operations of 1005 may be performed by a reference signal manager as described with reference to FIGS. 6 through 9.

At 1010, the UE may receive, from a second transmitting device, a second reference signal on a second set of resources that overlap in a time domain with the first set of resources. The operations of 1010 may be performed according to the methods described herein. In some examples, aspects of the operations of 1010 may be performed by a reference signal manager as described with reference to FIGS. 6 through 9.

At 1015, the UE may determine synchronization information for time tracking or frequency tracking of sidelink communications with the first transmitting device and the second transmitting device based on the first reference signal and the second reference signal. The operations of 1015 may be performed according to the methods described herein. In some examples, aspects of the operations of 1015 may be performed by a synchronization information manager as described with reference to FIGS. 6 through 9.

At 1020, the UE may communicate with the first transmitting device and the second transmitting device based on the synchronization information for time tracking or frequency tracking. The operations of 1020 may be performed according to the methods described herein. In some examples, aspects of the operations of 1020 may be performed by a sidelink communication manager as described with reference to FIGS. 6 through 9.

Figure 11:
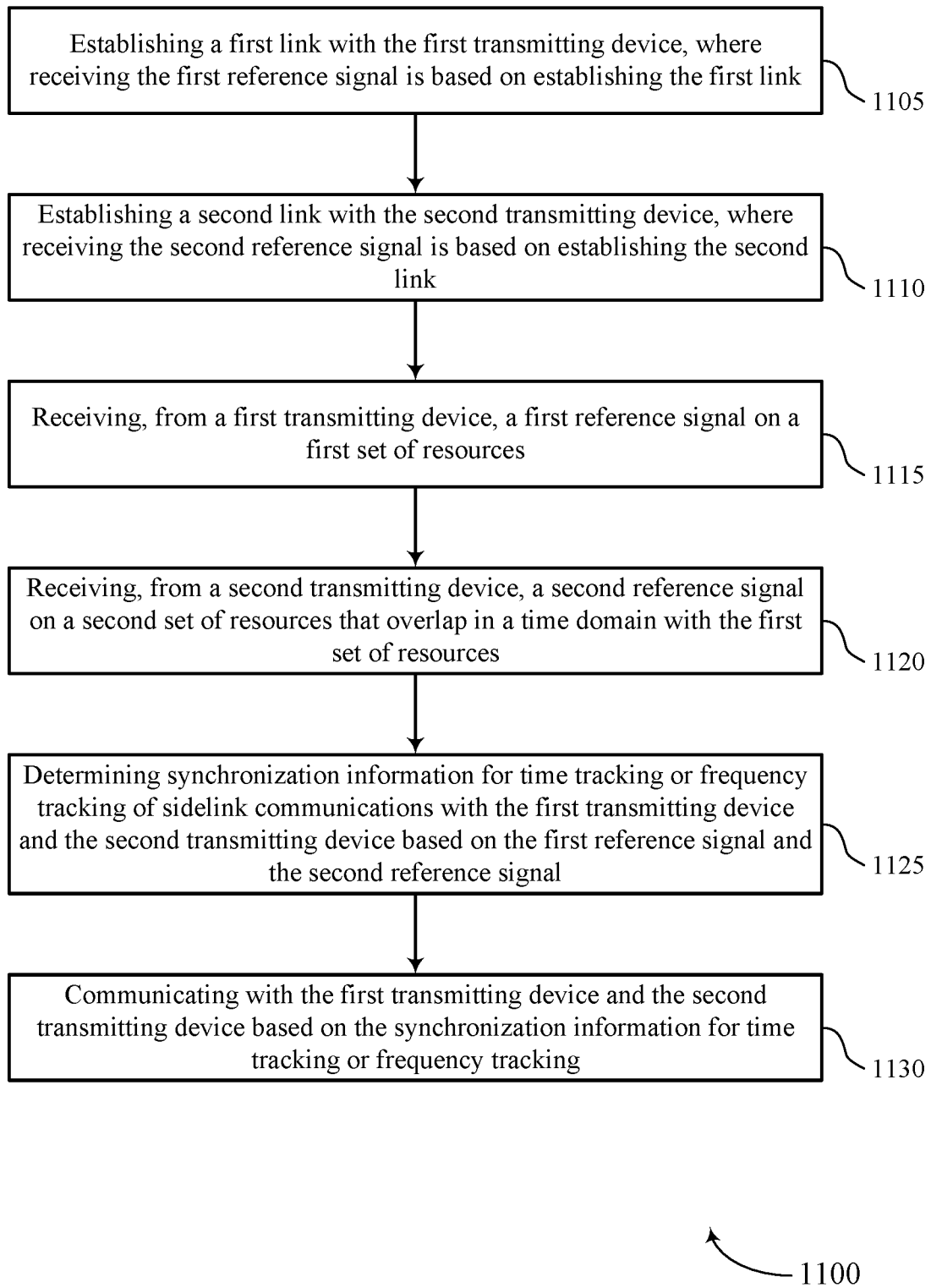

FIG. 11 shows a flowchart illustrating a method 1100 that supports techniques for communication link synchronization using reference signals in accordance with various aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1105, the UE may establish a first link with the first transmitting device, where receiving the first reference signal is based on establishing the first link. The operations of 1105 may be performed according to the methods described herein. In some examples, aspects of the operations of 1105 may be performed by a communication link manager as described with reference to FIGS. 6 through 9.

At 1110, the UE may establish a second link with the second transmitting device, where receiving the second reference signal is based on establishing the second link. The operations of 1110 may be performed according to the methods described herein. In some examples, aspects of the operations of 1110 may be performed by a communication link manager as described with reference to FIGS. 6 through 9.

At 1115, the UE may receive, from a first transmitting device, a first reference signal on a first set of resources. The operations of 1115 may be performed according to the methods described herein. In some examples, aspects of the operations of 1115 may be performed by a reference signal manager as described with reference to FIGS. 6 through 9.

At 1120, the UE may receive, from a second transmitting device, a second reference signal on a second set of resources that overlap in a time domain with the first set of resources. The operations of 1120 may be performed according to the methods described herein. In some examples, aspects of the operations of 1120 may be performed by a reference signal manager as described with reference to FIGS. 6 through 9.

At 1125, the UE may determine synchronization information for time tracking or frequency tracking of sidelink communications with the first transmitting device and the second transmitting device based on the first reference signal and the second reference signal. The operations of 1125 may be performed according to the methods described herein. In some examples, aspects of the operations of 1125 may be performed by a synchronization information manager as described with reference to FIGS. 6 through 9.

At 1130, the UE may communicate with the first transmitting device and the second transmitting device based on the synchronization information for time tracking or frequency tracking. The operations of 1130 may be performed according to the methods described herein. In some examples, aspects of the operations of 1130 may be performed by a sidelink communication manager as described with reference to FIGS. 6 through 9.

The following provides an overview of aspects of the present disclosure:

Aspect 1: A method for wireless communication by a receiving device, comprising: receiving, from a first transmitting device, a first reference signal on a first set of resources; receiving, from a second transmitting device, a second reference signal on a second set of resources that overlap in a time domain with the first set of resources; determining synchronization information for time tracking or frequency tracking of sidelink communications with the first transmitting device and the second transmitting device based at least in part on the first reference signal and the second reference signal; and communicating with the first transmitting device and the second transmitting device based at least in part on the synchronization information for time tracking or frequency tracking.

Aspect 2: The method of aspect 1, wherein determining the synchronization information comprises: identifying a first carrier frequency offset associated with the first transmitting device based at least in part on receiving the first reference signal, wherein communicating with the first transmitting device is based at least in part on identifying the first carrier frequency offset; and identifying a second carrier frequency offset associated with the second transmitting device based at least in part on receiving the second reference signal, wherein communicating with the second transmitting device is based at least in part on identifying the second carrier frequency offset.

Aspect 3: The method of any of aspects 1 through 2, wherein determining the synchronization information comprises: identifying a first timing offset associated with the first transmitting device based at least in part on receiving the first reference signal, wherein communicating with the first transmitting device is based at least in part on identifying the first timing offset; and identifying a second timing offset associated with the second transmitting device based at least in part on receiving the second reference signal, wherein communicating with the second transmitting device is based at least in part on identifying the second timing offset.

Aspect 4: The method of any of aspects 1 through 3, further comprising: establishing a first link with the first transmitting device, wherein receiving the first reference signal is based at least in part on establishing the first link; and establishing a second link with the second transmitting device, wherein receiving the second reference signal is based at least in part on establishing the second link.

Aspect 5: The method of any of aspects 1 through 4, wherein the first set of resources comprises a first set of frequency resources spanning one or more time periods in the time domain; and the second set of resources comprises a second set of frequency resources different than the first set of frequency resources spanning the one or more time periods in the time domain.

Aspect 6: The method of aspect 5, wherein the first set of frequency resources are contiguous in a frequency domain; and the second set of frequency resources are contiguous in the frequency domain.

Aspect 7: The method of any of aspects 5 through 6, wherein the first set of frequency resources are interleaved with the second set of frequency resources in a frequency domain.

Aspect 8: The method of any of aspects 5 through 7, wherein a first instance of the first set of frequency resources and a second instance of the second set of frequency resources are separated by a gap in a frequency domain.

Aspect 9: The method of any of aspects 1 through 8, wherein the first set of resources comprises a set of frequency resources spanning one or more time periods in the time domain; and the second set of resources comprises the set of frequency resources spanning the one or more time periods.

Aspect 10: The method of aspect 9, wherein the first reference signal is generated using a first Zadoff-chu sequence having a first root sequence; and the second reference signal is generated using a second Zadoff-chu sequence having a second root sequence different than the first root sequence.

Aspect 11: The method of aspect 10, wherein the first Zadoff-chu sequence and the second Zadoff-chu sequence have a same cyclic shift.

Aspect 12: The method of any of aspects 9 through 11, wherein the first reference signal is generated using a first Zadoff-chu sequence having a root sequence and a first cyclic shift; and the second reference signal is generated using a second Zadoff-chu sequence having the root sequence and a second cyclic shift different than the first cyclic shift.

Aspect 13: An apparatus for wireless communication by a receiving device, comprising a processor; memory coupled with the processor; and instructions stored in the memory and executable by the processor to cause the apparatus to perform a method of any of aspects 1 through 12.

Aspect 14: An apparatus for wireless communication by a receiving device, comprising at least one means for performing a method of any of aspects 1 through 12.

Aspect 15: A non-transitory computer-readable medium storing code for wireless communication by a receiving device, the code comprising instructions executable by a processor to perform a method of any of aspects 1 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a receiving device, comprising:
   receiving, from a first transmitting device, a first reference signal on a first set of resources;
   receiving, from a second transmitting device, a second reference signal on a second set of resources that overlap in a time domain with the first set of resources;
   determining synchronization information for time tracking or frequency tracking of sidelink communications with the first transmitting device and the second transmitting device based at least in part on the first reference signal and the second reference signal; and
   communicating with the first transmitting device and the second transmitting device based at least in part on the synchronization information for time tracking or frequency tracking.

2. The method of claim 1, wherein determining the synchronization information comprises:
   identifying a first carrier frequency offset associated with the first transmitting device based at least in part on receiving the first reference signal, wherein communicating with the first transmitting device is based at least in part on identifying the first carrier frequency offset; and
   identifying a second carrier frequency offset associated with the second transmitting device based at least in part on receiving the second reference signal, wherein communicating with the second transmitting device is based at least in part on identifying the second carrier frequency offset.

3. The method of claim 1, wherein determining the synchronization information comprises:
   identifying a first timing offset associated with the first transmitting device based at least in part on receiving the first reference signal, wherein communicating with the first transmitting device is based at least in part on identifying the first timing offset; and
   identifying a second timing offset associated with the second transmitting device based at least in part on receiving the second reference signal, wherein communicating with the second transmitting device is based at least in part on identifying the second timing offset.

4. The method of claim 1, further comprising:
   establishing a first link with the first transmitting device, wherein receiving the first reference signal is based at least in part on establishing the first link; and
   establishing a second link with the second transmitting device, wherein receiving the second reference signal is based at least in part on establishing the second link.

5. The method of claim 1, wherein:
   the first set of resources comprises a first set of frequency resources spanning one or more time periods in the time domain; and
   the second set of resources comprises a second set of frequency resources different than the first set of frequency resources spanning the one or more time periods in the time domain.

6. The method of claim 5, wherein:
   the first set of frequency resources are contiguous in a frequency domain; and
   the second set of frequency resources are contiguous in the frequency domain.

7. The method of claim 5, wherein the first set of frequency resources are interleaved with the second set of frequency resources in a frequency domain.

8. The method of claim 5, wherein a first instance of the first set of frequency resources and a second instance of the second set of frequency resources are separated by a gap in a frequency domain.

9. The method of claim 1, wherein:
   the first set of resources comprises a set of frequency resources spanning one or more time periods in the time domain; and the second set of resources comprises the set of frequency resources spanning the one or more time periods.

10. The method of claim 9, wherein:
the first reference signal is generated using a first Zadoff-chu sequence having a first root sequence; and
the second reference signal is generated using a second Zadoff-chu sequence having a second root sequence different than the first root sequence.

11. The method of claim 10, wherein the first Zadoff-chu sequence and the second Zadoff-chu sequence have a same cyclic shift.

12. The method of claim 9, wherein:
the first reference signal is generated using a first Zadoff-chu sequence having a root sequence and a first cyclic shift; and
the second reference signal is generated using a second Zadoff-chu sequence having the root sequence and a second cyclic shift different than the first cyclic shift.

13. An apparatus for wireless communication by a receiving device, comprising:
a processor,
memory coupled with the processor; and
instructions stored in the memory and executable by the processor to cause the apparatus to:
receive, from a first transmitting device, a first reference signal on a first set of resources;
receive, from a second transmitting device, a second reference signal on a second set of resources that overlap in a time domain with the first set of resources;
determine synchronization information for time tracking or frequency tracking of sidelink communications with the first transmitting device and the second transmitting device based at least in part on the first reference signal and the second reference signal; and
communicate with the first transmitting device and the second transmitting device based at least in part on the synchronization information for time tracking or frequency tracking.

14. The apparatus of claim 13, wherein the instructions to determine the synchronization information are executable by the processor to cause the apparatus to:
identify a first carrier frequency offset associated with the first transmitting device based at least in part on receiving the first reference signal, wherein communicating with the first transmitting device is based at least in part on identifying the first carrier frequency offset; and
identify a second carrier frequency offset associated with the second transmitting device based at least in part on receiving the second reference signal, wherein communicating with the second transmitting device is based at least in part on identifying the second carrier frequency offset.

15. The apparatus of claim 13, wherein the instructions to determine the synchronization information are executable by the processor to cause the apparatus to:
identify a first timing offset associated with the first transmitting device based at least in part on receiving the first reference signal, wherein communicating with the first transmitting device is based at least in part on identifying the first timing offset; and
identify a second timing offset associated with the second transmitting device based at least in part on receiving the second reference signal, wherein communicating with the second transmitting device is based at least in part on identifying the second timing offset.

16. The apparatus of claim 13, wherein the instructions are further executable by the processor to cause the apparatus to:
establish a first link with the first transmitting device, wherein receiving the first reference signal is based at least in part on establishing the first link; and
establish a second link with the second transmitting device, wherein receiving the second reference signal is based at least in part on establishing the second link.

17. The apparatus of claim 13, wherein:
the first set of resources comprises a first set of frequency resources spanning one or more time periods in the time domain; and
the second set of resources comprises a second set of frequency resources different than the first set of frequency resources spanning the one or more time periods in the time domain.

18. The apparatus of claim 17, wherein:
the first set of frequency resources are contiguous in a frequency domain; and
the second set of frequency resources are contiguous in the frequency domain.

19. The apparatus of claim 17, wherein the first set of frequency resources are interleaved with the second set of frequency resources in a frequency domain.

20. The apparatus of claim 17, wherein a first instance of the first set of frequency resources and a second instance of the second set of frequency resources are separated by a gap in a frequency domain.

21. The apparatus of claim 13, wherein:
the first set of resources comprises a set of frequency resources spanning one or more time periods in the time domain; and
the second set of resources comprises the set of frequency resources spanning the one or more time periods.

22. The apparatus of claim 21, wherein:
the first reference signal is generated using a first Zadoff-chu sequence having a first root sequence; and
the second reference signal is generated using a second Zadoff-chu sequence having a second root sequence different than the first root sequence.

23. The apparatus of claim 22, wherein the first Zadoff-chu sequence and the second Zadoff-chu sequence have a same cyclic shift.

24. The apparatus of claim 21, wherein:
the first reference signal is generated using a first Zadoff-chu sequence having a root sequence and a first cyclic shift; and
the second reference signal is generated using a second Zadoff-chu sequence having the root sequence and a second cyclic shift different than the first cyclic shift.

25. An apparatus for wireless communication by a receiving device, comprising:
means for receiving, from a first transmitting device, a first reference signal on a first set of resources;
means for receiving, from a second transmitting device, a second reference signal on a second set of resources that overlap in a time domain with the first set of resources;
means for determining synchronization information for time tracking or frequency tracking of sidelink communications with the first transmitting device and the second transmitting device based at least in part on the first reference signal and the second reference signal; and
means for communicating with the first transmitting device and the second transmitting device based at least in part on the synchronization information for time tracking or frequency tracking.

26. The apparatus of claim 25, wherein the means for determining the synchronization information comprises:
means for identifying a first carrier frequency offset associated with the first transmitting device based at least in part on receiving the first reference signal, wherein communicating with the first transmitting device is based at least in part on identifying the first carrier frequency offset; and
means for identifying a second carrier frequency offset associated with the second transmitting device based at least in part on receiving the second reference signal, wherein communicating with the second transmitting device is based at least in part on identifying the second carrier frequency offset.

27. The apparatus of claim 25, wherein the means for determining the synchronization information comprises:
means for identifying a first timing offset associated with the first transmitting device based at least in part on receiving the first reference signal, wherein communicating with the first transmitting device is based at least in part on identifying the first timing offset; and
means for identifying a second timing offset associated with the second transmitting device based at least in part on receiving the second reference signal, wherein communicating with the second transmitting device is based at least in part on identifying the second timing offset.

28. A non-transitory computer-readable medium storing code for wireless communication by a receiving device, the code comprising instructions executable by a processor to:
receive, from a first transmitting device, a first reference signal on a first set of resources;
receive, from a second transmitting device, a second reference signal on a second set of resources that overlap in a time domain with the first set of resources;
determine synchronization information for time tracking or frequency tracking of sidelink communications with the first transmitting device and the second transmitting device based at least in part on the first reference signal and the second reference signal; and
communicate with the first transmitting device and the second transmitting device based at least in part on the synchronization information for time tracking or frequency tracking.

29. The non-transitory computer-readable medium of claim 28, wherein the instructions to determine the synchronization information are executable to:
identify a first carrier frequency offset associated with the first transmitting device based at least in part on receiving the first reference signal, wherein communicating with the first transmitting device is based at least in part on identifying the first carrier frequency offset; and
identify a second carrier frequency offset associated with the second transmitting device based at least in part on receiving the second reference signal, wherein communicating with the second transmitting device is based at least in part on identifying the second carrier frequency offset.

30. The non-transitory computer-readable medium of claim 28, wherein the instructions to determine the synchronization information are executable to:
identify a first timing offset associated with the first transmitting device based at least in part on receiving the first reference signal, wherein communicating with the first transmitting device is based at least in part on identifying the first timing offset; and identify a second timing offset associated with the second transmitting device based at least in part on receiving the second reference signal, wherein communicating with the second transmitting device is based at least in part on identifying the second timing offset.

* * * * *